United States Patent [19]

Ceci

[11] 4,020,286
[45] Apr. 26, 1977

[54] SIGNAL ANALYSIS APPARATUS FOR AMPLITUDE STATISTICS

[75] Inventor: Barry L. Ceci, Rochester, N.Y.

[73] Assignee: Metrosonics, Inc., Rochester, N.Y.

[22] Filed: May 19, 1975

[21] Appl. No.: 578,690

[52] U.S. Cl. .......................... 179/1.5 A; 179/1 SC; 340/347 AD; 235/156

[51] Int. Cl.² .......................................... G10L 1/00

[58] Field of Search .................. 179/1.5 A, 1.5 C; 235/151.3, 152, 92 PC, 92 MT, 156; 340/172.5, 347, 347 AD

[56] References Cited

UNITED STATES PATENTS

| | | | |
|---|---|---|---|
| 3,160,741 | 12/1964 | Gottschall et al. | 235/92 PC |
| 3,657,926 | 3/1972 | Munson | 235/151.3 |
| 3,685,047 | 8/1972 | Scherer | 340/347 AD |
| 3,686,486 | 8/1972 | Coulter et al. | 235/92 PC |
| 3,712,536 | 1/1973 | Griffiths | 235/151.3 |
| 3,717,753 | 2/1973 | Thomas | 235/151.3 |
| 3,769,844 | 11/1973 | Skoures | 235/92 AE |
| 3,783,247 | 1/1974 | Klein et al. | 235/92 PC |
| 3,829,841 | 8/1974 | Steinberg | 340/172.5 |
| 3,924,112 | 12/1975 | Kashio | 235/156 |

OTHER PUBLICATIONS

Cohen et al., "Automatic Amplitude Normalization of Speech," IBM Tech. Discl., vol. 16, No. 8, Jan. 1974.
Golding et al., "Study of an Adaptive Quantizer," Proc. IEEE, vol. 55, No. 3, Mar. 1967.

*Primary Examiner*—Kathleen H. Claffy
*Assistant Examiner*—E. S. Kemeny
*Attorney, Agent, or Firm*—Martin Lukacher

[57] ABSTRACT

Acoustical signals of sound and noise levels are analyzed automatically for statistical characteristics of such signals which are required to be measured by recent environmental and health and safety regulations. The signals are applied to an analog to digital converter which tracks rapid changes in signal level and provides a digital output which represents the level in logarithmic (decibel) steps. The digital outputs which exist at successive sampling times provide a history of the sound level characteristics. A memory having a large sample capacity is provided to store these digital level samples. A storage capacity of several million samples is obtained by a random access memory which is addressed by the data representing the sound levels. A separate address is provided for each level (viz., for each of 100 levels differing from each other by 1 dB steps). Logic in the memory causes the digital numbers to be incremented each time a sample for the sound level corresponding to the address is presented to the memory. Totalizers and other arithmetic circuits receive data read out of the memory and provide outputs such as the percent of time that each sound level is exceeded, the amplitude distribution of the sound levels, the sound levels exceeded certain percentages of the time and other statistical amplitude distributions as are or may be required by environmental and health and safety regulations. Features of the invention include: an analog to digital converter with a variable gain amplifier whose feedback loop contains a BCD counter which generates the digital output signal; and an incremental adder which includes a counter for sequentially addressing each bit of stored digital numbers to be incremented.

24 Claims, 5 Drawing Figures

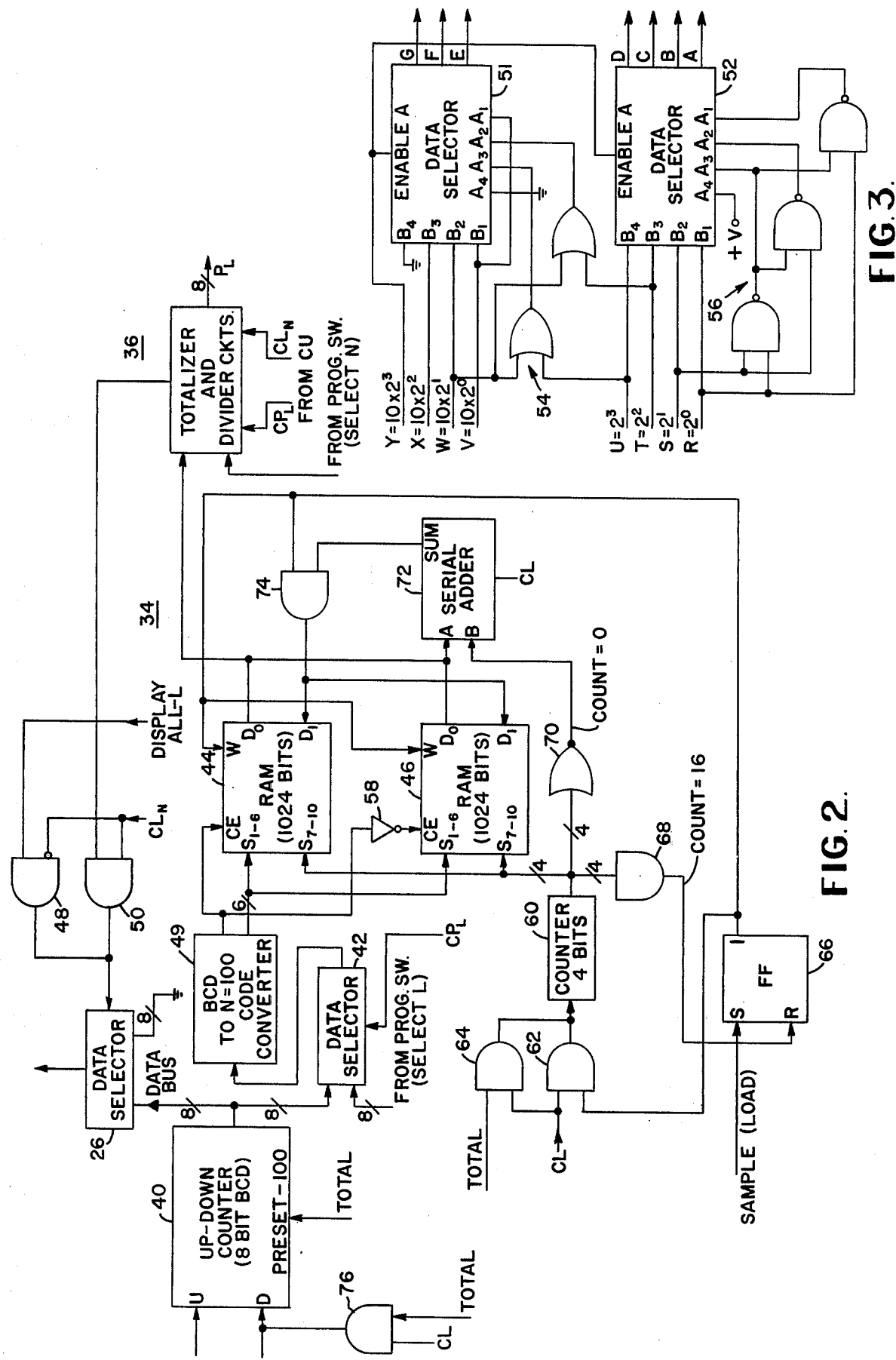

SIGNAL ANALYSIS APPARATUS FOR AMPLITUDE STATISTICS

The present invention relates to apparatus for signal analysis and particularly to systems and apparatus for the measurement and analysis of signals which vary over a wide range in the characteristic thereof which is to be measured or analyzed.

The invention is especially suitable for use in sound level analyzer systems and provides a means by which statistical noise level measurement and analyses of sound levels which exist over long periods of time can be made so as to determine whether or not there is compliance with environmental, health and safety and other regulations.

The durations of tests of sound levels (usually conducted for noise abatement and control purposes) may be as long as several days. On the other hand, tests for shorter periods of time from which results are immediately needed may be of much shorter intervals, say less than an hour in duration. To obtain results from any such tests, let alone the taking of the measurements themselves, has been a long and arduous task. Usually sound level data is gathered manually by taking periodic readings off the face of a sound level meter. Then, the necessary statistical distributions of the sound level data are manually computed. Unattended operations have involved recording the sound level meter output signals as on a magnetic recorder. The recorded data is then played back, digitized and then processed off line in a computer which is programmed to make statistical calculations. Even the unattended and computerized techniques are time consuming. All of the data for the entire test duration has to be taken before the statistical information is available, even from the computer. In other words the information is not available in real time. In addition, there are problems in making accurate measurements, particularly in digitizing the sound level signals because of their wide dynamic range (e.g., 100 dB); thus complex and expensive equipment has been required to convert the sound level signal into digital form. Due to limited memory capacities of existing systems, continuous sampling of the sound level, as opposed to recording of short intervals of sound level signals has not in many cases been feasible. For example, continuous sampling at one second intervals can easily produce over five million samples in a test of one week in duration. To provide storage for large numbers of sound level samples so as to enable the statistical characteristics of the sound level measurements with a minimum of complexity and cost, has therefore also been a problem. The necessity for solution of both the problems of accommodating the wide dynamic range of the sound level signals and the provision of storage capacity for millions of measurements of sound level data has further compounded the problem.

It is therefore an object of the present invention to provide improved apparatus for the analysis of signals and particularly sound level signals whereby the foregoing difficulties, disadvantages and problems may be overcome.

It is a further object of the present invention to provide apparatus for the measurement and analysis of signals, and particularly sound level signals, in real time so as to provide a directly available measurement of the sound levels and their statistical characteristics.

It is a still further object of the present invention to provide apparatus for the analysis and measurement of signals precisely and accurately, notwithstanding that the signals may vary over a wide dynamic range, such as 100 dB in amplitude.

It is a still further object of the present invention to provide signal analysis apparatus which is adapted to make and collect data over a long period of time and in large quantities so as to facilitate statistical anlaysis which requires a large number of samples of such data.

It is a still further object of the present invention to provide improved sound level analysis apparatus which performs the function of a sound level meter, a data acquisition unit, and a computer, so as to provide statistical measurements as of noise and other sound characteristics such as are required by governmental regulations.

It is a still further object of the present invention to provide an improved analog to digital converter which converts an input signal into a digital signal directly representing the level of the input signal in logarithmically related steps over a wide range of levels where the steps may be relatively small (for example, steps of 1 dB over a 100 dB level range).

It is a still further object of the present invention to provide an improved memory system having storage capacity for an extremely large number of samples such as may represent measurements of signal levels or other signal characteristics.

Briefly described, a signal analysis system embodying the invention includes an analog to digital converter having a wide dynamic range which converts the input signal to be measured into digital form. The digital format of the signal can be a multi-bit digital word which directly represents the signal level in 1 dB steps over a range of 100 dB. In order to follow or track the input signal over such a wide dynamic range, the analog to digital converter which is provided in accordance with the invention, may be a closed loop device having a variable gain amplifier including at the output thereof, if root means square (RMS) measurements are required, an RMS detector/amplifier unit, a comparator and a counter. When the input signal increases or decreases so as to reach the limits of a comparison range or window, the comparator produces an output pulse which increments or decrements the counter, the gain of the amplifier is controlled in accordance with the count stored in the counter. In order to provide rapid tracking or following of the input signal, the comparator output pulses are used for the additional purpose of changing the output voltage of the amplifier in a sense to drive it to the opposite end of the comparison window. This is preferably accomplished by means of a capacitive circuit in a filter of the RMS detector stage of the amplifier by charging or discharging the capacitive circuit rapidly upon occurrence of the comparator output pulses.

A memory for storing the digitized information which may be obtained from the counter of the analog to digital converter is provided by a random access memory system which is arranged so as to have extremely large capacity sufficient to store several million sound level samples. The memory includes address inputs, write inputs, as well as data inputs and outputs. The digital words representing the input signal levels select and provide access to different segments of the random access memory (RAM) which are uniquely dedicated to a particular digital word which repesents a particular sound level, say from 1 to 100 dB. Each of these memory segments may be capable of storing a plurality of bits. Each time a sample or measurement is taken, the portion of the RAM assigned to the signal level which is measured, is addressed. The digital word which is stored in that address or portion represents the number of samples or measurements of that input signal level, (i.e. how many times that particular input signal level was measured at each sampling time from the beginning of the test). The number (numerical value of the digital word) stored in the address may be incremented by means of a serial adder connected to receive data inputs from successive bit locations in the address and to provide sum outputs to the next succeeding bit locations. A counter, which is connected to address inputs of the RAM, addresses the particular bits of the word at the address selected by the digital signal representing the second level measurements. The capacity of the memory is determined by the length of the word in memory dedicated to each level and the number of levels which are to be measured. For example, a pair of 1024 bit RAM's having addresses of 16 bits corresponding to a 100 different input signal levels has a sample capacity in excess of six and one-half million samples. At a one-second sampling rate, over 18 hours of samples corresponding to the same input signal level would fill the address for each signal level. Inasmuch as signal levels vary statistically during a prolonged test, a memory containing only the pair of RAM's mentioned above would conservatively have sufficient capacity to accommodate a week-long test during which the sampling rate was one sample per second.

Totalizer and other arithmetic circuits are provided into which the information from the memory may be serially read out so as to provide measurements of the statistical characteristics of the input signals. In the case of sound and noise measurement, characteristics such as the percentile level factor, $P_L$, and the statistical noise level, $L_N$, may be obtained, as well as other statistical amplitude distribution of the sound level measurements. The percentile level factor, $P_L$, is the percentage of time that the sound or noise was at a certain level. The totalizers at each sampling time, the total number of samples, and then the number of samples at a particular level, corresponding to the value of the digital word at the address in the RAM for that level, is divided by the total so as to obtain the percentile level factor. The statistical noise level is the noise level exceeded N percent of the time. The selected percentage of the totalizer output word is then compared successively with the sum of the value of the words for each sound level, (viz., at each address) and the sound level words, which cause the sum value to have a value equal or greater than the total are read out to provide the $L_N$ readings.

The foregoing and other objects and advantages of the present invention will become more apparent from a reading of the following description of the preferred embodiment of the invention which is set forth hereinafter and is shown in the accompanying drawings in which:

FIG. 2 is a more detailed block diagram of the memory and arithmetic circuits of the system shown in FIG. 1;

FIG. 3 is a still more detailed block diagram of the BCD to 100-line code converter shown in FIG. 2;

Figure 1:
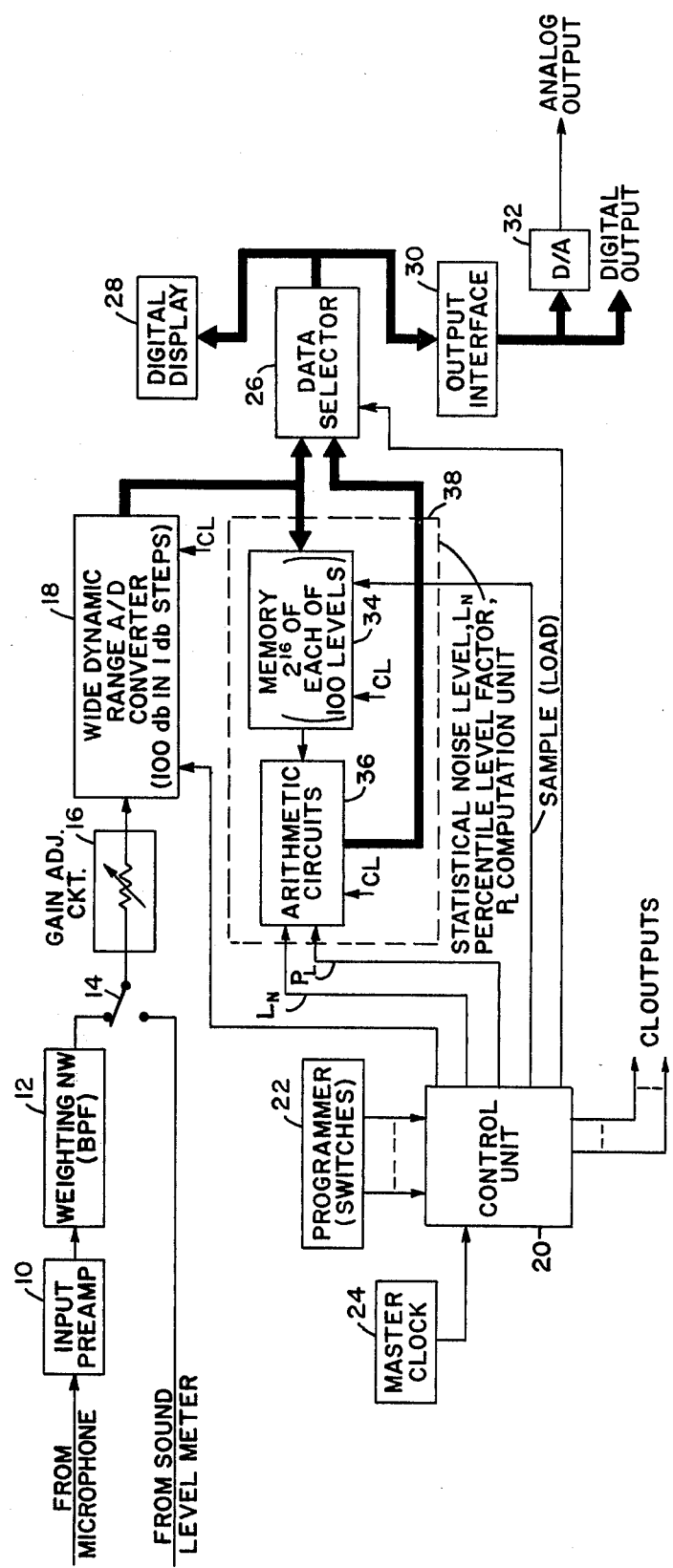
FIG. 1 is a simplified block diagram of a sound level analysis system embodying the invention.

Referring now to FIG. 1, there is shown a sound level analyzer system for providing real time analysis and measurement of sound levels as may be derived from microphones or from sound level meters, magnetic recorders, and other precision audio sources. This system may be used for noise level measurements and particularly for statistical analysis of noise and sound levels over long periods of time as may be required for environmental studies and impact statements as may be required by governmental regulations concerning environmental protection and occupational health and safety.

Signals of low level from various types of microphones are amplified in a preamplifier 10 and applied to a weighting network 12 which is a band bass filter weighted to the "A" response as defined by the American National Standard Institute (ANSI) Specification For Sound Level Meters (S 1.4–1971). Direct high level inputs from sound level meters or from magnetic recorders may be applied directly to the system such that sound level signals conditioned in accordance with the applicable specification, such as the ANSI specification referenced above, may be selected by means of a switch 14. A gain adjustment circuit 16 such as an adjustable gain buffer amplifier may be used to calibrate the system and provide the sound level input signal to a wide dynamic range analog to digital converter 18. This digital converter digitizes the sound level input signals and provides a digital output having a selectable fast or slow response (either 125 ms or one second time constant) as defined by the above referenced ANSI specification. The converter 18 is capable of following or tracking the sound level input signal over a 100 dB range (the range of 100,000 to 1 in signal amplitude). The digital output is in the form of a multi-bit digital word (8 bits in a binary coded decimal (BDC) format being used in this embodiment) so as to provide digital outputs representing 100 levels L from $L_0$ to $L_{99}$ in accordance with the value of the BCD output word from the converter 18. The system may also perform as a sound level meter with digital readout.

A control unit 20 is provided with inputs from programmer switches 22 which may be digital thumb wheel switches of the type conventionally available. The control unit also receives inputs from a master clock 24. Outputs from the control unit 20 are clock pulses, $C_L$, and command levels for clearing the units at the beginning of a computation cycle, sampling the digital word representing the sound level measurements at the output of the converter 18 and otherwise selecting operational modes of the system.

The system may be operated as a digital sound level meter when a command from the control unit is provided to a data selector 26 (suitably an integrated circuit which selects and gates different inputs thereto to the output thereof). The digital signals in the form of the BCD words from the converter 18 are applied by way of the data selector 26 to a digital display 28 such as a light emitting diode (LED) display and also to an output interface unit 30 which provides the digital signals to a digital to analog converter 32 or to other digital systems such as, digital printers, computers, digital cassette recorders, and the like. In the event that either the digital display or the output interface unit are to be alternatively selected, another data selector (not shown) may be operated by commands from the control unit 20 so as to select either the output interface 30 or the digital display 28. The analog outputs may be applied to chart recorders so as to provide plots of the sound level data. A test duration clock may also be used if desired such that the test duration may be shown on the digital display 28 or inputted to the chart recorder, say to the X axis thereof. Other data may be applied to the output interface unit at timed intervals such that digital outputs from the system may be plotted along the X axis of the plot provided by the chart recorders, while the system digital outputs are plotted along the Y axis thereof.

A memory unit 34 and arithmetic circuits 36 are part of a computation unit 38 which provides statistical data as to the distribution of the varying sound level measurements which occur over test periods. Such test periods may be long periods of time, say several days. Of course shorter test durations of as little as several minutes may also be accommodated by the system. The memory provided in accordance with this preferred embodiment of the invention has storage for over 6½ million samples of sound level data. The memory is provided by random access memory units which provide storage locations, each having a capacity of 16 bits (viz. a numerical count of $2^{16}$). Separate storage locations, each of 16 bit capacity, are provided for each of the 100 levels (the 1 dB level steps) provided by the analog to digital converter 18. Briefly, the sample and load pulse from the control unit 20 which may occur at a one sample per second sampling rate, or such other sampling rate as may be required, enables the memory 34 to receive the digital output signal from the converter 18. This digital signal then addresses the memory location assigned to the sound level represented by the digital input signal to the memory. The presence of the digital signal also increments the digital word stored at that location by one. Accordingly, the value of the digital number in each memory locations represents the total number of samples of the same level which occur during the tests. Each storage location has a count capacity of $2^{16}$ bits, or 65,536 counts. For a sampling rate of one sample per second, the memory capacity of the memory 34 would not be exhausted even if the same sound level was continuously measured and the same storage location in the memory was addressed for a period of 18.2 hours. Each of the 100 locations in the memory 34 therefore has a capacity of 18.2 hours of measurement. Since the sound level measurements are statistically distributed throughout a test, it will be appreciated that the capacity of the memory is sufficient for a long test duration, say up to one week, even at a sampling rate of one sample per second.

The computation unit 38 has arithmetic circuits which are selectively conditionable by outputs from the control unit 20 selected by the programmer switches 22 to provide various statistical measurements of the sound level data which are stored in the memory. Two such measurements which have been required by governmental regulations are the statistical noise level $L_N$ and the percentile level factor $P_L$. The statistical noise level $L_N$ is defined as the noise level exceeded N percent of the time. The percentile level factor $P_L$ is the percentage of the time that the noise level was at a particular level L. Both $L_N$ and $P_L$ may be obtained at selected times during a test from the contents of the memory. The arithmetic circuits 36 include totalizers or accumulators for accumulating the sum of the contents of each of the 100 memory locations in the memory 34. The registers are also included in the circuits 36, in which the contents or the number of counts in any particular memory location or groups of such locations, may be stored. Dividing circuits and multiplying circuits, preferably of the type using conventional serial arithmetic logic, are also included in the arithmetic circuits 36. The percentile level factor $P_L$ is computed by reading out of the memory, into a register in the arithmetic circuit, the contents of the memory location designated by the $P_L$ input. The content of this register is then divided by the sum of the total contents of all of the storage locations in the memory. The output $P_L$ may be obtained successive sampling times during the test and is applied through the data selector 26 to either the digital display 28 or the output interface unit 30.

The statistical noise level $L_N$ also uses the accumulated contents of the memory locations, each time the $L_N$ value is desired. The contents of the memory is then multiplied by the percentage N by the multiplier unit in the arithmetic circuits 36 and stored in a register contained in the circuits 36. Then the memory is read out starting from the storage location representing the highest sound level again into the accumulators. After the end of each addition of each memory location, beginning with the contents of the highest level location, the sum is compared to the N percentage of the total which was previously stored in a register in the arithmetic circuits. When the contents of the registers are equal to or greater than each other, the address of the memory location (which of course represents the noise level exceeded N percent of the time) is read out to the data selector 26 and may be displayed on the display 28 or provided, via the interface 30, in digital form to the digital outputs or digital to analog converter 32 for plotting the $L_N$ values. The circuitry of the memory and arithmetic circuits, so far as is necessary for an understanding of this invention, is shown in FIGS. 2 and 3. The wide dynamic range analog to digital converter is described in detail hereinafter in connection with FIGS. 4 and 5.

Referring to FIG. 2, the digital signals representing the sound levels are generated in an up/down counter 40. The counter 40 is preferably part of the analog to digital converter 18 and serves to generate the digital signal representing the sound level in 8-bit binary coded decimal (BDC) format. These digital signals are applied to a data bus which is connected to the data selector 26 and also to another data selector 42. The digital signals from the counter 40 are passed via the data selector 42 to address random access memory units 44 and 46 of the memory 34, both for writing information as to the sound level samples represented by the words generated by the counter 40 and for reading the data stored in the memory. In the event that data as to the number of samples at a particular sound level L is desired, the address in the form of a digital signal of BCD format similar to that generated by the counter 40 is inputted to the data selector 42 from the programmer switches 22, together with a command $CP_L$ to the data selector 42. In such event the RAM's 44 and 46 will be addressed and enabled to read out the storge locations in the RAM's 44 and 46 for the selected sound level L.

The data selector 26 applies to the digital display 28 and the output interface 30, the digital signal which is stored in the counter (viz., the count in the counter 40)

or a signal representing 0 as provided by the eight lines thereto which are connected to ground. The output from the data bus is selected either when a command to display all-L is applied to a gate 48 or a command to read out the $L_N$ value is applied to another gate 50. In the absence of the command to read out the $L_N$ value ($CL_N$), the gate 48 is enabled by the display all-L command from the control unit. This applies a level to the data selector 26 to pass the data bus to the output of the data selector. In the presence of a $CL_N$ command, the gate 48 is inhibited, while the gate 50 is enabled. An input to the gate 50 from the arithmetic circuits 36 maintains a binary 0 command level on the control input of the data selector 26 until $L_N$ value is obtained. This value is obtained at the time that the counter 40 outputs a digital signal corresponding to the $L_N$ value. The data selector 26 is then enabled to pass the data on the data bus (viz. the digital word in the counter 40) which is then read out to the digital display 28 or output interface 30.

The RAM's 44 and 46 each have storage for 1024 of bits; thus each RAM has the capacity to store 64 16-bit words. Inasmuch as storage is needed for 100 16-bit words, each corresponding to a different one of the 100 dB steps of the sound level represented by the digital signal generated in the counter 40, two RAM's 44 and 46 are utilized. Access to and addressing of the different storage locations in the RAM's 44 and 46 is accomplished through the use of the 8-bit BCD word provided either from the counter 40 or from the programmer switches 22. The RAM's have address inputs $S_1$ to $S_6$ for addressing 64 different storage locations of 16 bits each. The RAM's 44 and 46 also have four additional address lines $S_7$ to $S_{10}$ for addressing any of the 16 bits within any of the 64 locations which are selected by the address lines $S_1$ to $S_6$. Since 100 storage locations are used in this embodiment, 64 such locations may be provided by the RAM 44 and the remaining 36 locations by the RAM 46. By enabling the RAM 44 and inhibiting the RAM 46 through the use of the chip enable (CE) inputs thereof, either the RAM 44 or the RAM 46 may be addressed.

The 8-bit digital signal from the counter 40 or from the program select switch 22 is converted into a 7-bit signal for addressing the RAM's 44 and 46 by a binary coded decimal to N = 100 code converter 49. This code converter may be provided by the data selector circuits 51 and 52 and the gating logic 54 and 56 illustrated in FIG. 3. The 8-bit BCD input word, YXWVUTSR, is applied to the data selectors 50 and 52 and to the logic 54 and 56. The A enable input of the data selector circuits 50 and 52 receive the highest order bit Y of the digital signal. Inasmuch as this bit is a 0 up to and including a count of 79 (0 to 79), the B inputs of the data selectors are then enabled and the outputs of the data selectors are a word GFEDCBA which is the same as the seven low order bits of the word YXWVUTSR. When the most significant bit Y becomes a 1 and for counts or values of the digital signal from the counter 40 from 80 to 99, the A enable input is high. Thus, the A inputs of the data selectors provide the output word GFEDCBA. The truth table afforded by the data selectors and the logic circuits 54 and 56 is set forth in Table I below:

TABLE I

| COUNT | INPUT WORD | | 7 BIT OUTPUT WORD | |
|---|---|---|---|---|
|  | XYWV | VTSR | GFE | DCBA |
| 80 | 1000 | 0000 | 000 | 1111 |
| 81 | 1000 | 0001 | 000 | 1110 |
| 82 | 1000 | 0010 | 000 | 1101 |
| 83 | 1000 | 0011 | 000 | 1011 |
| 84 | 1000 | 0100 | 010 | 1111 |
| 85 | 1000 | 0101 | 010 | 1110 |
| 86 | 1000 | 0110 | 010 | 1101 |
| 87 | 1000 | 0111 | 010 | 1011 |
| 88 | 1000 | 1000 | 100 | 1111 |
| 89 | 1000 | 1001 | 100 | 1110 |
| 90 | 1001 | 0000 | 001 | 1111 |
| 91 | 1001 | 0001 | 001 | 1110 |
| 92 | 1001 | 0010 | 001 | 1101 |
| 93 | 1001 | 0011 | 001 | 1011 |
| 94 | 1001 | 0100 | 011 | 1111 |
| 95 | 1001 | 0101 | 011 | 1110 |
| 96 | 1001 | 0110 | 011 | 1101 |
| 97 | 1001 | 0111 | 011 | 1011 |
| 98 | 1001 | 1000 | 101 | 1111 |
| 99 | 1001 | 1001 | 101 | 1110 |

The highest order bit G of the 7-bit output word from the code converter 49 is applied directly to the chip enable input of the RAM 44 and via an inverter 58 to the chip enable input of the RAM 46. In this manner 100 storage locations or addresses each corresponding to a different sound level, as represented by bits corresponding digital signal generated in the counter 40, are obtained. Access to the individual bits in each storage location starting with the lowest order one of the 16 bits is obtained by means of a counter 60 which is a 4-bit or divide by 16 counter having its four output lines connected to the remaining address inputs $S_7$ to $S_{10}$ of the RAM's 44 and 46. This counter 60 receives clock pulses $C_L$ from the control unit either via a gate 62 or another gate 64.

When data is to be written into the memory, a sample (load) pulse is applied at each sampling time from the control unit. This pulse sets a flip-flop latch 66 which enables the gate 62 and allows the counter to count up to 16. For each clock pulse a successive bit of the addressed one of the 100 storage locations in the RAM's 44 and 46 is individually addressed. For read out purposes a total command is applied to the gate 64 and the clock pulses are gated via the gate 64 so as to cause the counter 60 to count up. The output lines from the counter are connected to an AND gate 68 which serves as a count of 16 decoder and resets the latch 66 at a count of 16 which will occur after the highest order bit of the address storage location in the RAM's has individually been addressed.

Writing of data into the RAM's 44 and 46 takes place automatically upon occurrence of each sample pulse. The number or value of the 16-bit digital word stored in the address storage location in the RAM is incremented by one, so as to denote the presence of an additional sample of the sound level corresponding to that storage location occurred at the sampling time. At each sampling time, therefore, the value of one of the 100 sixteen bit words at the 100 different address locations in the RAM will be incremented. The RAM's 44 and 46 therefore are continuously updated and store the number of samples which have been taken from the beginning of the test, as well as the number of samples of each of the 100 sound levels which have been measured also from the beginning of the test. It will be appreciated of course that the RAM's and all the counters are cleared by cycling the counters 40 and 60 through each of their values at the beginning of a test. The circuitry for clearing the counters, RAMS and other data storage devices in the system is not shown in order to simplify the illustration.

Data is written into the RAMS and read out of the RAMS on a serial bit-by-bit basis, lowest order bit first. Consider that a sample load command has set the flip-flop latch 66 and the counter 60 starts to count up. At a count of zero, a NOR gate 70 conncted to the output lines of the counter 60 detects a count of zero in the counter 60 and applies an input to the B input of a serial adder 72. At this time the digital signal in the counter 40 is applied to the data selector 42 and the code converter 49 to address the particular one of the 100 locations which corresponds to the sound level represented by the digital signal in the counter 40. It may be preferable also to apply the output of the flip-flop latch 66 to inhibit both the up and down inputs to the counter 40 during a load cycle so as to avoid any possibility that the counter word may change during the load cycle.

The serial adder 72 also receives as its A input the output data from the data output $D_o$ of the RAMS 44 and 46. The sum output of the adder 72 is connected via a gate 74 which is enabled during the load cycle by the flip-flop 66, to the data input $D_i$ of the RAMS 44 and 46. At a count of zero the lowest order bit of the address storage location is read out of the data output of the RAMS, added to the binary 1 pulse in the adder 72 and applied to the data inputs $D_i$. Since the write input is enabled, the lowest order bit of the address location is then incremented by one. When the counter 60 reaches a count of two (viz, on the next clock pulse) the bit internally carried within the adder 72 is added to the value of the bit in the next highest order bit in the addressed storage location, and the sum is written into the next highest bit position of that storage location. After the counter 60 has reached a count of 16 all of the 16 bit positions will have successively been addressed, and the digital number stored therein will have been incremented by one. The memory therefore automatically stores the data respecting the sound level variation at each sampling time throughout the entire test in a non-destructive manner and with a minimum of hardware.

In order to read out the memory, the up/down counter 40 may be preset to 99 and clock pulses applied by way of a gate 76 to the down input of the counter 40. Clock pulses are also applied by way of the gate 64 to the 4-bit counter 60. The clock applied to the 4-bit counter is of course a much higher frequency clock than the clock applied to the down input of the counter 40. In this manner each storage location in the RAMS 44 and 46 will be addressed sequentially from storage location 100 down through storage location 1, and each bit in each storage location will be addressed, lowest order bit first. The data output $D_o$ of the RAMS then provide a serial chain of bits. The digital signal word in the counter 40 identifies the address location or sound level word being read out.

The signals read out of the RAMS 44 and 46 are applied to the arithmetic circuits 36. These arithmetic circuits may be totalizer (accumulator) and divider circuits of the type known in the art. The totalizer circuits may be serial accumulators which store the total number of samples. When a $CP_L$ command from the control unit appears, a total cycle is carried out so as to store the values of all of the digital words in the RAMS in a register in the totalizer. Then the $CP_L$ command reads out the address location for the samples at which the selected level L have been measured. These samples are stored in a $P_L$ register. A divider circuit receives the data from the totalizer and from the $P_L$ register and produces a $P_L$ output word which may be applied to the digital display. Alternatively, and in lieu of the data selector 42, the up/down counter 40 may be preset as by applying the number of pulses corresponding to the L value desired and used to address the RAMS 44 and 46 so as to read out the address locations for the selected L value. The $P_L$ word from the arithmetic circuit is applied to the data bus as by way of another data selector (not shown).

In order to obtain the $L_N$ values, a total cycle is first performed. The number stored in the totalizer register is then multiplied by N percent, as by circulating the totalizer register output through a rate multiplier and storing in an auxiliary register. Then, another total cycle is performed, starting with the address for the highest level (viz. address location 100). The number stored in the totalizer register is applied to a comparator for comparison with the number stored in the auxiliary register. When a compare output is produced (the $CL_N$ command being present) the gate 50 enables the data selector 26 to output the counter digital signal or word to the display 28 or output interface 30. Successive $P_L$ and $L_N$ commands may be generated at intervals determined by a test duration clock or auxiliary counter in the control unit, thereby to provide information from which a plot of the statistical distributions $L_N$ and $P_L$ may be produced.

Figure 4:
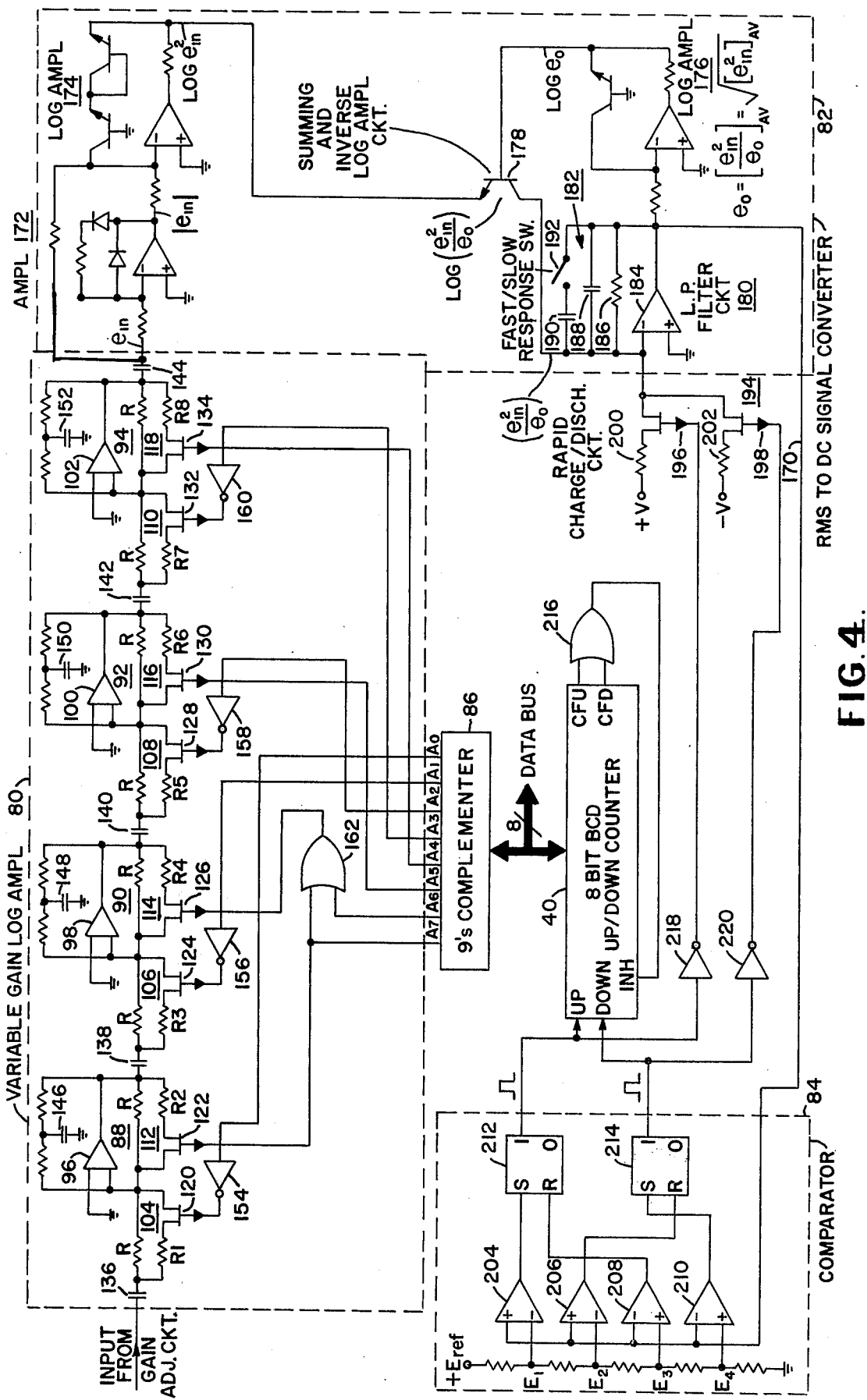
FIG. 4 is a circuit diagram of the wide dynamic range analog to digital converter shown in FIG. 1.

The sound level measurements themselves are provided by the wide range analog to digital converter 18 which produces the digital signal or counter word 40. This unit is illustrated in FIG. 4 to which reference is now made. The unit consists of a variable gain logarithmic amplifier 80 which is switchable to provide 100 decibels (dB) of gain in 1 dB steps. Another amplifier is connected to the output of the variable gain amplifier 80, which affords a root means square (RMS) to DC signal converter 82. A comparator 84 compares the amplifier output obtained from the RMS to DC converter 82 with a 1 dB window and provides pulses to the up and down inputs of the counter 40 when the amplifier output voltage rises above or falls below this window. A nine's complementor logic 86 translates the digital signal stored in the counter 40 into switching signals for varying the gain of the amplifier 80. The counter 40 stores the count in 8-bit BCD format and also applies the stored count to the data but in BCD format. The analog to digital converter 18 is a closed loop system which changes the gain of the amplifier 80 in 1 dB steps to maintain the output of the amplifier within a 1 dB window, the count stored in the counter 40 which controls the amplifier gain, represents the level of the input signal in 1 dB steps and in BCD format.

The variable gain logarithmic amplifier 80 has four cascaded or tandem connected operational amplifier stages 88, 90, 92 and 94. The stages each contain a separate operational amplifier 96, 98, 100 and 102. Input resistor networks 104, 106, 108 and 110 and feedback resistor networks 112, 114, 116 and 118 control the gain of each stage. Each of these networks 104 to 118 has a resistor of value R in parallel with another resistor of value $R_1$, $R_2$, $R_3$, $R_4$, $R_5$, $R_6$, $R_7$ and $R_8$ and a field effect switching transistor 120 to 134.

These transistors switch their associated resistors $R_1$ through $R_8$ is parallel with the resistor of value R when a negative enabling level (a binary zero level) is applied thereto. Inasmuch as the gain of an operational amplifier stage is increased when the input resistance thereof is decreased or when the feedback resistance thereof is increased, enabling the input resistor network switching transistors 120, 124, 128, 132 and inhibiting the feedback resistor network switching transistors 122, 126, 130, 133, will increase the gain of the logarithmic amplifier to its maximum gain which is 125 dB as set forth below in Table II. Table II also sets forth the relative values of the resistors in the networks 104 through 118, the gain provided when the switching transistor associated with each resistor $R_1$ through $R_8$ is enabled and also the values of the enabling bits $A_0$ through $A_7$ at the output of the nine's complementor 86 which effect changes in the gain of the amplifier in 1 dB steps.

TABLE II

| Resistor | Value | Stage Gain | Enabling Bit |
|---|---|---|---|
| R1 = | 8.27 R = | 1dB = | $A_0$ |
| R2 = | .01 R = | 40dB = | $A_7$ |
| R3 = | 3.86 R = | 2dB = | $A_1$ |
| R4 = | 0.01 R = | 40dB = | $A_6$ or $A_7$ |
| R5 = | 1.71 R = | 4dB = | $A_2$ |
| R6 = | .111 R = | 20dB = | $A_5$ |
| R7 = | .66 R = | 8dB = | $A_3$ |
| R8 = | .46 R = | 10dB = | $A_4$ |
| Total gain | | 125dB | |

The variable gain log amplifier 80 is an AC amplifier. Each stage 88 through 94 and also the input and output of the amplifier 80 are AC coupled by capacitors 136, 138, 140, 142 and 144. These capacitors also serve to prevent the flow of bias current between stages. T networks 146, 148, 150 and 152 also insure AC rather than DC signal amplification in the amplifier 80 by providing DC feedback so as to maintain unity gain at each stage 88 through 94 while shunting AC feedback to ground through the capacitors of the T networks 146 to 152.

The BCD digital signal from the counter 40 is nine's complemented in the nine's complementor logic 86 so as to provide switching signals which change the gain of the amplifier in 1dB steps from zero to 99 dB. An integrated circuit which is commercially available may be used as the nine's complementor 86. The amplifier control is simplified and provided directly over the 100 dB range through the use of the nine's complementor. Consider that an input signal level of zero dB is represented by a BCD code of 00000000. The nine's complement of this code, or the signals $A_7$, $A_6$, $A_5$, $A_4$, $A_3$, $A_2$, $A_1$ and $A_0$ from the nine's complementor, is 10011001. When this nine's complement code is applied through the arrangement of inverters 154, 156, 158 and 160 to the field effect transistors 120, 124, 128 and 132 in the input networks 104, 106, 108 and 110, and the remaining bits $A_4$ through $A_7$ are applied to the field effect transistors 122, 126, 130 and 134 in the feedback networks 112, 114, 116 and 118 (the bit $A_7$ being applied via an OR gate 162 so as to operate the field effect transistor switches 122 and 126), the amplifier 80 provides a gain of 99 dB. If the input signal level increases 1 dB the counter will be incremented 1 bit by virtue of the operation of the RMS to DC signal converter 82 and comparator 84, as will be explained more fully hereinafter, such that the BCD digital signal in the counter 40 will become 00000001. The nine's complement of this number is 10011000. Then the $A_0$ bit becomes a 0 causing an inhibiting level to be applied to the field effect transistor switch 120. The gain of the first stage 88 of the amplifier 80 is then reduced by 1 dB and the overall gain becomes 98 dB. Similarly, all level changes in the input signal as it increases in level in 100 steps from 0 dB to 99 dB (a 100 dB range) will be followed by corresponding 1 dB gain variations in the amplifier 80. The BCD digital signal counter bus directly represents the input signal level in 1 dB steps over the 100 dB range. Upon the increase in signal level to 99 dB, the gain in the amplifier drops to 0 dB. In such event the input resistor network field effect transistor switches are inhibited and the feedback transistor network field effect transistors are enabled such that the input resistor networks and the feedback resistor networks all present a resistance of the same value, namely R, and the amplifier effectively exhibits unity gain. As mentioned above, the various amplifier gain levels corresponding to the enabling nine's complementor output bits $A_0$ to $A_7$ are shown in Table II. It will be noted that for the higher gains of 80 dB and above, at least two amplifiers will share the gain, since the feedback networks 112 and 114 are then both operated by the $A_7$ bit by virtue of the presence of the OR gate 162.

The RMS to DC converter 82 converts the AC output signal from the variable gain amplifier 80 into a DC signal corresponding to the RMS or root means square of the value of the amplifier output signal. This amplifier output signal is indicated in FIG. 4 as $e_{in}$. The RMS to DC converter output signal is indicated as $e_o$, which is the root means square of the DC or average value of the input signal $e_{in}$ as indicated by the equation adjacent the output line 170 of the RMS to DC converter 82.

The converter 82 includes a first amplifier stage 172 provided by an operational amplifier having a pair of back-to-back diodes in its feedback circuit. This amplifier has a gain of unity and serves as a full wave rectifier by virtue of the operation of the diodes in the feedback circuit thereof. The output signal from the amplifier 172 is therefore equal to the absolute value of the instantaneous input signal and is shown as $|e_{in}|$ in the drawings.

This signal is applied to a log amplifier 174 afforded by an operational amplifier having a pair of transistors in its feedback path. The base to emitter path of each of these transistors in the feedback circuit of the amplifier 174 each presents a logarithmic current versus voltage characteristic such that the combination of the two transistors in series presents a characteristic which is a function of the logarithm squared. The output voltage of the amplifier 174 is therefore the logarithm of the input voltage $|e_{in}^2|$ or $\log|e_{in}^2|$.

Another log amplifier 176 having a single transistor in its feedback path, to provide a logarithmic amplification characteristic, applies the logarithm of the output voltage to a transistor 178. The transistor 178 receives the output of the log amplifier 176 on its base while the output of the log amplifier 174 is received by the emitter of the transistor 178. The transistor 178 then subtracts the log amplifier 176 output from the output of the log amplifier 174. Subtraction of two logarithms produces the logarithm of their ratios or $\log(e_{in}^2/e_o)$. The emitter to collector path of the transistor 178 however provides an inverse log characteristic; the transistor 178 constituting a summing and inverse log amplifier circuit. Thus, the output at the collector of the transistor 178 is directly proportional to ($e_{in}^2/e_o$). This signal is provided to a low pass filter circuit 180 which provides the average value thereof, due to the integrating effect of the capacitive circuit 182 in the feedback path of an operational amplifier 184 which constitutes the circuit 180.

This capacitive circuit consists of a resistor 186 in shunt with a capacitor 188. The response time of the analog to digital converter is a function of the time constant of this capacitive circuit 182. Accordingly, by connecting another capacitor 190 in shunt with the capacitor 188 by means of a switch 192, the response may be changed from fast to slow, or from a 125 ms to a 1 second time constant, as required by the above referenced ANSI Specification.

This capacitive circuit 182 is rapidly charged or discharged by a rapid charge/discharge circuit 194 whenever the output voltage $e_o$ reaches the limits of the 1 dB window as detected by the comparator 84. The action of the rapid charge/discharge circuit 194 is to drive the output voltage $e_o$ to the opposite end of the window thereby permitting the converter system 18, as a whole, to follow and track rapid variations in the level of the input signal which is being digitized. Specifically, the rapid charge/discharge circuit 194 includes a pair of field effect transistor switches 196 and 198. The transistor switch 196 connects a source of positive voltage indicated at +V through a resistor 200 so as to charge the capacitor 188 thereby driving the output of the filter circuit 180 in a negative direction and enabling the circuit to track any continued increase in input signal level. The switching transistor 198, when enabled, connects a source of negative voltage indicated at −V to a resistor 202 to the capacitor 188 causing it to discharge such that the output of the filter circuit 180 is driven in the positive direction. The system then is able to track and follow a continuing drop in input signal level. The quick charge and discharge characteristic and its effect on the output signal $e_o$ from the RMS to DC signal converter 82 is illustrated in waveform (c) of FIG. 5.

The integrating or averaging operation of the low pass filter circuit 180 provides an output voltage which is equal to the average value of the input voltage thereto or $[e_{in}^2/e_o]_{AV}$. The output voltage $e_o$ is therefore the root means square of the average value of the input signal to the RMS to DC signal converter or $\sqrt{[e_{in}^2]_{AV}}$.

It is this root means square output voltage $e_o$ which is applied to the comparator 84. The comparator 84 consists of a source of reference potential indicated at +$E_{ref}$ which is connected across a voltage divider to provide four successively lower reference $E_1$, $E_2$, $E_3$, and $E_4$. A 1 dB window, having a center voltage level $E_{ctr}$, is defined between voltages $E_2$ and $E_3$. $E_1$ is slightly higher than $E_2$ while $E_4$ is slightly lower than $E_3$ to provide hysteresis effect at opposite ends of the window, thereby to inhibit any oscillation at the switching time (viz, when the count in the counter is incremented or decremented and the gain of the amplifier is switched).

The output voltage $e_o$ and the reference voltages $E_1$ through $E_4$ are respectively applied to four comparator amplifiers 204, 206, 208 and 210, the comparator amplifiers 204 and 210 set flip-flop latches 212 and 214 when the output voltage increases to $E_1$ or decreases to $E_4$ respectively. The comparator amplifier 208 resets the latch 212 when the output voltage $e_o$ drops to $E_3$. The comparator amplifier 206 resets the latch 14 when the output voltage rises to $E_2$. The comparator amplifiers 204 to 210 and latches 212 and 214 thereby provide a steering circuit for producing a pulse on an output line to the up input of the counter 40 when the output voltage $e_o$ rises to the upper end of the window and another output pulse to the down input of the counter 40 when the output voltage $e_o$ reaches the lower end of the window. It will be noted that an OR gate 216 is connected to detect the counter is full in the up direction or in the down direction (CFU or CFD) so as to provide an inhibit input to the counter thereby preventing the gain of the amplifier from increasing above 99 dB, when the input signal is at 0 dB and from changing from 0 dB, when the input signal is above 100 dB. In the event that a carry-out pin is available from the counter unit 40, the output from said pin may be used to provide the inhibit input.

The comparator output pulses are applied through inverters 218 and 220 so as to provide enabling levels to the field effect transistors 196 and 198 in the charge/discharge circuit 194 when the pulses occur. The output voltage $e_o$ is then driven to the opposite end of the window as illustrated in waveform (c) of FIG. 5. The input voltage to the RMS to DC converter 82 is limited to a very narrow range by virtue of the operation of the converter loop. Nevertheless the RMS to DC converter 82 is capable of following a very large range of input signal level variations, thus eliminating the need for special compensating and/or switching circuitry to digitize input signals which vary over the wide dynamic 100 dB range.

Figure 5:
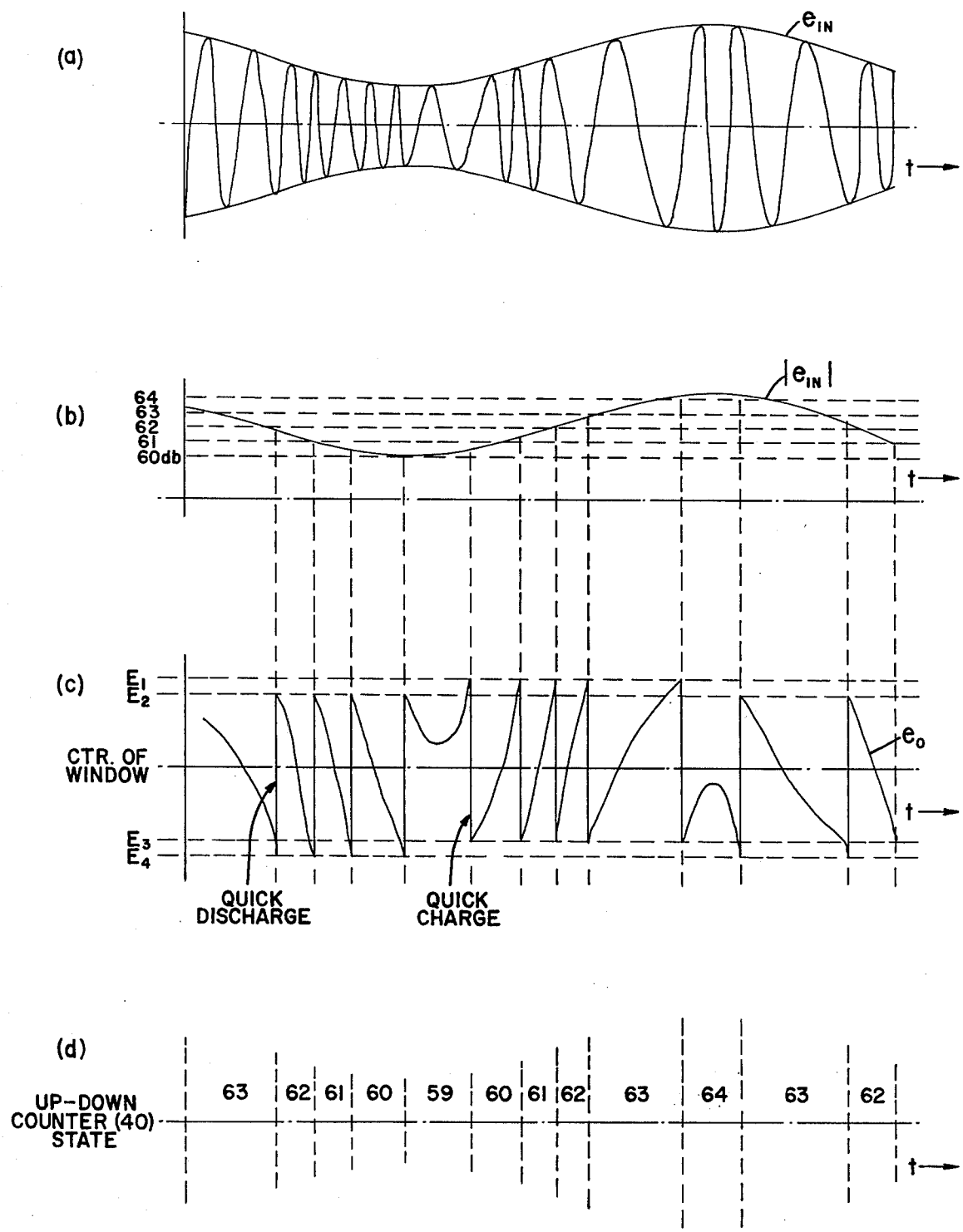
FIG. 5 is a series of waveforms and charts illustrative of the operation of the converter circuit shown in FIG. 4.

The operation of the analog to digital converter 18 will be still more apparent from FIG. 5. The input signal $e_{in}$ to the RMS to DC converter is an AC signal as illustrated in waveform (a). This signal is rectified in the amplifier 172 to provide a signal $|e_{in}|$ which is illustrated in waveform (b), for the exemplary case where the input signal level varies between 60 and 64 dB. This rectified input signal is converted to an output signal $e_o$ corresponding to the root means square of the average value thereof by the remainder of the RMS-DC signal converter. This output signal $e_o$ and the effect of the rapid charge and discharge circuit 194 thereof is illustrated in waveform (c). As the output voltage $e_o$ reaches the end of and 1 dB window (viz., between 63 and 62 dB, 62 and 61 dB, 61 and 60 dB, etc., as shown in waveform (d)) the pulses are produced by the comparator 84 which change the counter state to digital signals representing the counter state (viz. 63, 62, 61, 60, 59 ...) in binary coded decimal form. Accordingly, the analog to digital converter tracks the input signal levels and provides a BCD format digital output signal from the counter 40 which directly corresponds thereto.

From the foregoing description it will be apparent that there has been provided an improved analyzer system which is particularly adapted for the analysis and/or monitoring of input signals corresponding to sound levels, such as noise, in a manner to provide information regarding the statistical characteristics of such input signals. While the invention has been described in its preferred embodiment as a sound level analyzer, it will be appreciated that the invention in its various aspects will have other applications in signal analysis, analog to digital conversion, data storage and other digital signal processing applications. Also variations and modifications in the herein described system will undoubtedly suggest themselves to those skilled in the art. Accordingly, the foregoing description should be taken as illustrative and not in any limiting sense.

What is claimed is:

1. A signal analysis system which can analyze the statistical characteristics of signals while they occur in real time, which system comprises
   a. means for converting in real time an input signal into first digital signals corresponding to the level of said input signal in a multiplicity of steps each representing a different successively higher value of the level of said signals,
   b. means operative in real time and responsive to said first digital signals for generating and storing second digital signals each corresponding to a different one of said first digital signals and representing the number of said first digital signals which correspond thereto occurring during a given period of time,
   c. means also operative in real time and responsive to said second digital signals for providing output signals representing statistical characteristics of said input signals,
   d. said generating and storing means including a random access memory, means responsive to said first digital signal for addressing said memory to the locations of storage of the second digital signals corresponding to said first digital signals, a serial adder, and means for serially recirculating data through said adder out of and back into said memory for incrementing said second digital signal, and
   e. said recirculating means including a counter for counting up to a count number at least equal to the number of bits in said second digital signal, said counter being connected to said random access memory for sequentially addressing each bit of said stored second digital signals.

2. The invention as set forth in claim 1 wherein said output signal providing means includes means for generating successively third digital signals corresponding to said addresses and for operating said counter to count up to said count number during each of said third digital signal, serial totalizer circuit means, said totalizer means being connected to the output of said memory.

3. A signal analysis system which can analyze the statistical characteristics of signals while they occur in real time which system comprises
   a. means for converting in real time an input signal into first digital signals corresponding to the level of said input signal in a multiplicity of steps each representing a different successively higher value of the level of said signals,
   b. means operative in real time and responsive to said first digital signals for generating and storing second digital signals each corresponding to a different one of said first digital signals and representing the number of said first digital signals which correspond thereto occurring during a given period of time,
   c. means also operative in real time responsive to said second digital signals for providing output signals representing statistical characteristics of said input signals, and
   d. said converting means being analog to digital converter means for continuously following variations in amplitude of said input signal, said analog to digital converter means having a counter for generating said first digital signals.

4. The invention as set forth in claim 3 wherein said analog to digital converter also includes a variable gain amplifier, operated by said counter to change the gain thereof, and means responsive to the output of said amplifier for changing the count stored therein.

5. The invention as set forth in claim 4 wherein said count changing means includes comparator means for detecting when said amplifier output changes with respect to a certain output level and for providing pulses upon occurrence of said changes, and means for applying said pulses to said counter for changing the count therein.

6. The invention as set forth in claim 5 further comprising means for changing the amplitude of said amplifier output signal in opposite senses, and means responsive to said pulses for changing said amplitude in the sense opposite to the sense in which amplitude changes when said pulses are produced.

7. The invention as set forth in claim 6 wherein said amplitude changing means includes a capacitor connected to said amplifier, and circuit means responsive to said pulses for selectively charging and discharging said capacitor.

8. The invention as set forth in claim 6 wherein said variable gain amplifier includes a plurality of stages, each having networks connected thereto for controlling the gain of said amplifier logarithmically in binarily related steps to provide gain which varies in a multiplicity of dB steps, switching means connected to said networks for switching said networks into and out of said stages, means coupling said switching means to said counter, so as to change the count in said counter and varying the gain of said amplifier to maintain the output thereof at a certain amplitude whereby the count in said counter provides said first digital signal.

9. The invention as set forth in claim 8 wherein said variable gain amplifier includes, and has connected to the output of the last stage thereof, means for providing as said amplifier output signal a signal corresponding to the root means square of the average value (RMS-Average) of the signal produced by said last stage.

10. The invention as set forth in claim 9 wherein said RMS average value producing means comprises a first stage for rectifying last stage output, a first log amplifier, a summing amplifier for providing a signal corresponding to the inverse log of the sum of the signals applied thereto, a low pass filter circuit input connected to the output of said summing amplifier for providing said amplifier output signal, another log amplifier to which said filter is output connected, said summing amplifier being input connected to said first and said other log amplifier.

11. The invention as set forth in claim 10 wherein said filter circuit includes a capacitor connected to the output thereof and means for charging and discharging said capacitor when said count in said counter changes respectively to change the amplifier output in a sense opposite to changes in the gain of said amplifier whereby said change in gain can rapidly track said input signal so as to maintain said amplifier output constant.

12. An analog to digital converter which comprises a variable gain amplifier responsive to the analog input signal to be digitized, a counter for controlling the gain of said amplifier, and providing a digital signal corresponding to the amplitude of said input signal, a comparator responsive to a reference voltage and the output of said amplifier for providing output pulses when said output increases or decreases by certain amplitudes with respect to said reference voltage, means for applying said pulses to said counter for increasing and decreasing the count stored therein to maintain said amplifier output within a range between said certain amplitudes, and means responsive to said pulses for changing said output by approximately said certain amplitude in senses opposite to the sense in which said output changed when said pulses were produced so as to enable said converter rapidly to track changes in amplitude of said input signal.

13. The invention as set forth in claim 12 wherein said amplifier output changing means includes a capacitive circuit in said amplifier and means responsive to said pulses for charging and discharging said capacitive circuit.

14. The invention as set forth in claim 13 wherein said amplifier includes circuit means at the output thereof for providing, as said amplifier output, a signal corresponding to the root means square of the average value of the amplitude of an input signal to said circuit means, said circuit means including a low pass filter including said capacitive circuit, and switching means operated by said pulses for connecting sources of voltage of opposite polarity to said capacitive circuit for charging and discharging said capacitive circuit.

15. The invention as set forth in claim 12 wherein said variable gain amplifier includes a plurality of tandem stages providing gains in a multiplicity of binarily and logarithmically related dB steps, switching means in said stages coupled to said counter for changing the gain of said amplifier to correspond inversely to the count stored in said counter, said counter being an up/down counter having up and down inputs, and said means for applying said pulses to said counter including steering means for applying a pulse to the up input of said counter when said output increases and to said down input of said counter when said gain decreases whereby the count in said counter is the digital signal which represents the amplitude of said input signal in dB steps.

16. The invention as set forth in claim 15 wherein said counter is a BCD counter.

17. The invention as set forth in claim 16 wherein said amplifier stages are each operational amplifiers having an input network and an output network each including a separate switch of said switching means for respectively increasing and decreasing the gain of said each stage when said switches are enabled, and logic means including a nine's complementor for coupling said BCD counter to said switches.

18. The invention as set forth in claim 17 wherein said stages are A.C. coupled to each other, and circuit means connected to the last of said stages for converting the output of said last stage into a dc signal corresponding to the root means square thereof.

19. A memory system for storing data corresponding to the presence of a multiplicity of different input words of digital data, which system comprises a random access memory (RAM) having address inputs greater in number than the number of bits in said input words, data inputs and outputs and a write command input, means for presenting said input words to part of said address inputs, so as to select certain bit storage locations in said RAM corresponding thereto, a counter having a plurality of outputs corresponding in number to the remaining part of said address inputs and having a count capacity at least equal to the number of bits in each said storage locations for addressing each said locations, a serial adder having a pair of inputs and a sum output, said RAM data output being connected to one of said serial adder inputs, means for applying an input pulse to the other of said serial adder sum inputs when said counter reaches a certain count, and means for simultaneously enabling said RAM write input to receive a write command and said RAM data input to receive the sum output of said adder for a period of time commencing when said data representing the presence of said input word is to be written in said memory and said counter reaches a count greater by at least said number of bit storage locations than said certain count whereby to increment the value of an output digital word stored in the RAM bit storage locations corresponding thereto when said input digital word is present.

20. The invention as set forth in claim 19 including a pair of said RAMS having said counter and serial adder connected in parallel thereto, and means responsive to the highest order bit of said input digital word to enable different ones of said pair of RAMS to receive said input digital words at the address inputs thereof.

21. The invention as set forth in claim 19 including a counter for generating said input digital words, and means for incrementing said counter while said simultaneous write and data input enabling means are inhibited for serially reading out said RAM.

22. An analog to digital converter which comprises
a. a variable gain amplifier responsive to the analog input signal to be digitized, said amplifier having a plurality of networks each providing said amplifier with a different gain, said different gains being related to each other in successively higher steps, and switching means connected to said networks for selectively changing the gain of said amplifier,
b. a counter having an input and a plurality of outputs providing a digital signal representing the count therein and the level of said analog input signal, means coupling said outputs to said switching means for changing the gain of said amplifier in accordance with the value of said digital signal, and
c. a comparator responsive to a reference voltage having an upper and lower values and to the output of said amplifier for providing output pulses to the input of said counter for increasing and decreasing the count therein to maintain said amplifier output between said upper and lower values.

23. The invention as set forth in claim 22 further comprising circuit means connected between said amplifier output and said comparator for converting said amplifier output into a signal corresponding to the RMS of the average value thereof and applying said signal to said comparator.

24. The invention as set forth in claim 22 wherein said amplifier has a plurality of operational amplifier stages, each including a different one of said networks respectively in input and feedback relationship therewith.

* * * * *